United States Patent
Seo et al.

(10) Patent No.: US 8,028,910 B2
(45) Date of Patent: Oct. 4, 2011

(54) TAG ANTI-COLLISION RFID SYSTEM AND METHOD FOR TAG IDENTIFICATION

(75) Inventors: Kyung-Ho Seo, Gyeonggi-do (KR); Se-Hyun Oh, Seoul (KR); Jin-Hee Yoon, Seoul (KR); Joo-Mun Lee, Gyeonggi-do (KR); Won-Jun Lee, Seoul (KR); Ji-Hoon Myung, Seoul (KR)

(73) Assignee: SK Telecom Co., Ltd. (KR)

( * ) Notice: Subject to any disclaimer, the term of this patent is extended or adjusted under 35 U.S.C. 154(b) by 619 days.

(21) Appl. No.: 11/817,333

(22) PCT Filed: Dec. 14, 2005

(86) PCT No.: PCT/KR2005/004290
§ 371 (c)(1),
(2), (4) Date: May 7, 2008

(87) PCT Pub. No.: WO2006/095953
PCT Pub. Date: Sep. 14, 2006

(65) Prior Publication Data
US 2008/0283600 A1 Nov. 20, 2008

(30) Foreign Application Priority Data
Mar. 10, 2005 (KR) .................. 10-2005-0020283

(51) Int. Cl.
*G06K 7/00* (2006.01)
(52) U.S. Cl. .............. 235/439; 370/320; 370/335
(58) Field of Classification Search .......... 235/439; 370/320, 335
See application file for complete search history.

(56) References Cited

U.S. PATENT DOCUMENTS

| | | | |
|---|---|---|---|
| 6,859,801 B1 | 2/2005 | Law et al. | |
| 2003/0019929 A1* | 1/2003 | Stewart et al. | 235/385 |
| 2004/0134984 A1 | 7/2004 | Powell et al. | |

FOREIGN PATENT DOCUMENTS

| | | |
|---|---|---|
| JP | 2000-048136 | 2/2000 |
| WO | 01/57779 | 8/2001 |
| WO | WO 01/57779 | 8/2001 |

* cited by examiner

*Primary Examiner* — Daniel Hess
*Assistant Examiner* — Rafferty Kelly
(74) *Attorney, Agent, or Firm* — Baker & Hostetler LLP (57) ABSTRACT

The present invention relates to a tag anti-collision Radio Frequency Identification (RFID) system and a method for tag identification. The method for tag identification consists of a first step of initializing a queue (Q) field and storing a prefix of a candidate queue (CQ) field in the queue field; a second step of transmitting a query including the prefix stored in the queue field to the RFID tags, and deleting the transmitted prefix from the queue field; a third step of inserting a prefix, in which prefixes 0 and 1 are inserted into a rear portion of a prefix of a previously transmitted query, into the queue field if two or more tags respond to the previously transmitted prefix and, therefore, the tags cannot be identified, and inserting the prefix of the previously transmitted query into the candidate queue field and deleting an unnecessary prefix stored in the candidate queue if there is no response or only one tag responds with respect to the previously transmitted prefix; and a fourth step of determining whether a prefix stored in the queue field exists, and returning to the second step if there is a prefix stored in the queue field.

8 Claims, 7 Drawing Sheets

ID of tag A = 01010000
ID of tag B = 01011010
ID of tag C = 10001111

| Round | Query | Tag A | Tag B | Tag C | Response | Queue Q | Candidate Queue CQ |
|---|---|---|---|---|---|---|---|
| 0 |   |   |   |   |   | 0,1 |   |
| 1 | 0 | O | O | X | Collision | 1,00,01 |   |
| 2 | 1 | X | X | O | 10001111 (Identification) | 00,01 | 1 |
| 3 | 00 | X | X | X | No Response | 01 | 1,00 |
| 4 | 01 | O | O | X | Collision | 010,011 | 1,00 |
| 5 | 010 | O | O | X | Collision | 011,0100,0101 | 1,00 |
| 6 | 011 | X | X | X | No Response | 0100,0101 | 1,00,011 |
| 7 | 0100 | X | X | X | No Response | 0101 | 1,00,011,0100 |
| 8 | 0101 | O | O | X | Collision | 01010,01011 | 1,00,011,0100 |
| 9 | 01010 | O | X | X | 01010000 (Identification) | 01011 | 1,00,011,0100, 01010 |
| 10 | 01011 | X | O | X | 01011010 (Identification) |   | 1,00,011,0100, 01010,01011 |

FIG. 3

ID of tag A = 01010000
ID of tag B = 01011010
ID of tag C = 10001111

| Round | Query | Tag A | Tag B | Tag C | Response | Queue Q | Candidate Queue CQ |
|---|---|---|---|---|---|---|---|
| 0 | | | | | | 1,00,011,0100, 01010,01011 | |
| 1 | 1 | X | X | O | 10001111 (Identification) | 00,011,0100, 01010,01011 | 1 |
| 2 | 00 | X | X | X | No Response | 011,0100, 01010,01011 | 1,00 |
| 3 | 011 | X | X | X | No Response | 0100,01010, 01011 | 1,00,011 |
| 4 | 0100 | X | X | X | No Response | 01010,01011 | 1,00,011,0100 |
| 5 | 01010 | O | X | X | 01010000 (Identification) | 01011 | 1,00,011,0100, 01010 |
| 6 | 01011 | X | O | X | 01011010 (Identification) | | 1,00,011,0100, 01010,01011 |

ID of tag A = 01010000
ID of tag C = 10001111

| Round | Query | Tag A | Tag C | Response | Queue Q | Candidate Queue CQ |
|---|---|---|---|---|---|---|
| 0 | | | | | 1,00,011,0100, 01010,01011 | |
| 1 | 1 | X | O | 10001111 (Identification) | 00,011,0100, 01010,01011 | 1 |
| 2 | 00 | X | X | No Response | 011,0100, 01010,01011 | 1,00 |
| 3 | 011 | X | X | No Response | 0100,01010, 01011 | 1,00,011 |
| 4 | 0100 | X | X | No Response | 01010,01011 | 1,00,011,0100 |
| 5 | 01010 | O | X | 01010000 (Identification) | 01011 | 1,00,011,0100, 01010 |
| 6 | 01011 | X | X | No Response | | 0,1 |

FIG. 6

| Round | Candidate Queue CQ |
|---|---|
| 0 | 1(Identified),00(No Response),011(No Response),0100(No Response),01010(Identified), 01011(No Response) |
| 1 | 1(Identified),00(No Response),011(No Response),0100(No Response),0101(Identified) |
| 2 | 1(Identified),00(No Response),011(No Response),010(Identified) |
| 3 | 1(Identified),00(No Response),01(Identified) |
| 4 | 1(Identified),0(Identified) |

FIG. 7

ID of tag A = 01010000
ID of tag C = 10001111

| Round | Query | Tag A | Tag C | Response | Queue Q | Candidate Queue CQ |
|---|---|---|---|---|---|---|
| 0 | | | | | 0,1 | |
| 1 | 0 | O | X | 01010000 (Identification) | 1 | 0 |
| 2 | 1 | X | O | 10001111 (Identification) | | 0,1 |

TAG ANTI-COLLISION RFID SYSTEM AND METHOD FOR TAG IDENTIFICATION

TECHNICAL FIELD

The present invention relates to a tag anti-collision Radio Frequency Identification (RFID) system and a method for tag identification, which can rapidly identify tags using the extension of prefixes and a candidate queue.

BACKGROUND ART

A RFID system is an automatic identification system. A RFID reader recognizes an object through wireless communication with a tag that is attached to the object and that has an unique ID and information. Such a RFID reader must rapidly identify tags. As a reader and tags communicate through a single shared wireless channel, the signals thereof collide with each other. Such a collision interferes with the fast identification of tags or causes cases in which the reader cannot identify all objects.

As a result, in a RFID system including one reader and low-functional tags, anti-collision protocols which are capable of decreasing the frequency of collisions and rapidly identifying tags regardless of the occurrence of collisions is required.

Collisions are classified into reader collisions and tag collisions. The reader collisions are a confusion phenomenon occurring when neighboring readers simultaneously attempt to acquire information from a tag. The tag collisions are a phenomenon in which tags simultaneously try to respond to one reader, thereby preventing the reader from identifying the tags.

Reader collisions can be easily resolved because readers can detect collisions and communicate with one another. In contrast, since low-functional passive tags cannot determine the presence of neighboring tags or detect collisions, a tag anti-collision protocol significantly governs the identification ability of a RFID system.

Tag anti-collision protocols may be mainly categorized into an aloha-based protocol and a tree-based protocol.

The aloha-based tag anti-collision protocol employs a method in which tags select an arbitrary time and transmit their own IDs to a reader. This decreases the frequency of occurrence of tag collisions by decreasing the probability thereof, but cannot completely prevent the occurrence of collisions. Furthermore, a tag starvation phenomenon, in which a specific tag is not identified by a reader for a long time due to collisions, may occur.

The tag starvation phenomenon is a great disadvantage in an application system, such as logistics management, in which accuracy is important, therefore the aloha protocol is a representative probabilistic collision prevention protocol.

The tree-based tag anti-collision protocol, such as a binary tree protocol and a query tree protocol, employs a process of tracking the occurrence of collisions and detecting the existence of lags. The tree-based tag anti-collision protocol causes a long identification delay, but the tag starvation phenomenon does not occur.

The tree-based protocol divides a group of colliding tags into two sub groups, and then causes a reader to identify the IDs of tags without a collision therebetween. A binary tree protocol divides the group of colliding tags into two sub groups according to a randomly selected number using a counter with a random number generator. The tags which select 0 transmit their IDs. However, in this method, tags require a random number generator and a counter function.

Furthermore, in the query tree protocol, a reader transmits a query having a prefix several bits long, and a tag having an ID matched to a corresponding prefix responds. Colliding tags are classified according to the prefix of the reader. In this case, since the tags do not require additional memory other than memory for IDs, the query tree protocol is referred to as a memoryless protocol. In the query tree protocol, there is an advantage in that the function of a tag is simple, but there is a problem in that a long identification delay may be caused depending on the method of distribution of the IDs of tags which must be identified by a reader due to the use of prefixes.

Meanwhile, there are many modified protocols for the decrease of the long identification delay in the query tree protocol, but the frequency of the occurrence of collisions cannot be decreased merely by decreasing the time required for tag ID transmission.

DISCLOSURE OF THE INVENTION

Accordingly, the present invention has been made keeping in mind the above problems occurring in the prior art, and an object of the present invention is to provide a tag anti-collision RFID system and a method for tag identification, in which a complicated function is not required for tags, the frequency of the occurrence of collisions can be reduced, and a reader can rapidly identify all tags without a tag starvation phenomenon occurring.

BEST MODE FOR CARRYING OUT THE INVENTION

In order to accomplish the object, the present invention includes a tag identification method of a Radio Frequency Identification (RFID) reader for identifying a plurality, of RFID tags which transmit their own IDs to the RFID reader when prefixes of queries received from the RFID reader match front portions of the RFID tags' IDs, including a first step of initializing a queue (Q) field and storing a prefix of a candidate queue (CQ) field in the queue field, wherein, assuming that a pair of processes, in which the RFID reader transmits a query and one or more RFID tags respond to it, is one round, the RFID reader has a data field, including the queue field and the candidate queue field, which stores prefixes to be transmitted in a subsequent round; a second step of transmitting a query including the prefix stored in the queue field to the RFID tags, and deleting the transmitted prefix from the queue field; a third step of inserting a prefix, in which prefixes 0 and 1 corresponding to one bit are inserted into a rear portion of a prefix of a previously transmitted query, into the queue field if two or more tags respond to the previously transmitted prefix and, therefore, the tags cannot be identified, and inserting the prefix of the previously transmitted query into the candidate queue field and deleting an unnecessary prefix stored in the candidate queue if there is no response or only one tag responds with respect to the previously transmitted prefix; and a fourth step of determining whether a prefix stored in the queue field exists, and returning to the second step if there is a prefix stored in the queue field.

Furthermore, in order to accomplish the object, the present invention includes a tag anti-collision RFID system, including RFID tags transmitting their own IDs to a RFID reader when prefixes of queries received from the RFID reader match the front portions of the RFID tags' IDs; and a RFID reader having a data field including a queue (Q) field and a candidate queue (CQ) field which, assuming that a pair of processes, in which the RFID transmits a query and one or more RFID tags respond to it, is one round, stores prefixes to be transmitted in a subsequent round, initializing the queue field, storing a prefix of the candidate queue field in the queue field, sequentially transmitting a query including the prefix stored in the queue field to the RFID tags until all of the tags are identified, deleting the transmitted prefix from the queue field, inserting a prefix, in which prefixes 0 and 1 corresponding to one bit are inserted into a rear portion of a prefix of a previously transmitted query, into the queue field if two or more tags respond to the previously transmitted prefix, and inserting the prefix of the previously transmitted query into the candidate queue field and deleting an unnecessary prefix stored in a candidate queue if mere is no response or only one tag responds with respect to the previously transmitted prefix.

The characterized processes in the tag identification method of the present invention include a query insertion process and a query deletion process. In order to efficiently identify tags, in the present invention, prefixes obtained in a previous lag identification process are inserted or deleted, and tags require only a function of matching their own IDs to the prefixes.

As the frequency of collisions between signals of tags decreases, the tag identification speed of a reader increases. Based on the result of a simulation in the present invention, the occurrence of collisions is limited, communication overload is prevented, and the total delay time for the identification of all tags is decreased.

The protocol according to the tag identification method of the present invention identifies tags through continuous communication between a reader and tags. The reader queries whether tags within its own identification range have the IDs of specific prefixes, and then identifies the IDs of tags.

The tag identification protocol according to the tag identification method of the present invention is constituted by rounds. In each round, a reader transmits a query and tags respond to it.

The query of the reader includes a prefix having 1 to n bits (n=the bit numbers of a tag's ID). Tags, the front portion of the ID of which is matched to the prefix transmitted as a query, respond with their IDs. The reader can identify the ID of the tag when only one tag responds.

In a RFID network, when two or more tags simultaneously respond, a collision occurs. In this case, a reader cannot identify tags but can know that a portion of the ID of two or more tags matches the prefix.

As a result, in the present invention, the RFID reader re-transmits prefixes one bit longer than prefixes previously transmitted as a query in order to identify the tags that collide. The reader continues extending prefixes until the IDs of all tags have been identified.

The details of the above-described object, technical construction and operational effect of the present invention are more clearly understood by the descriptions below based on the accompanying drawings in the specification of the present invention.

Figure 1:
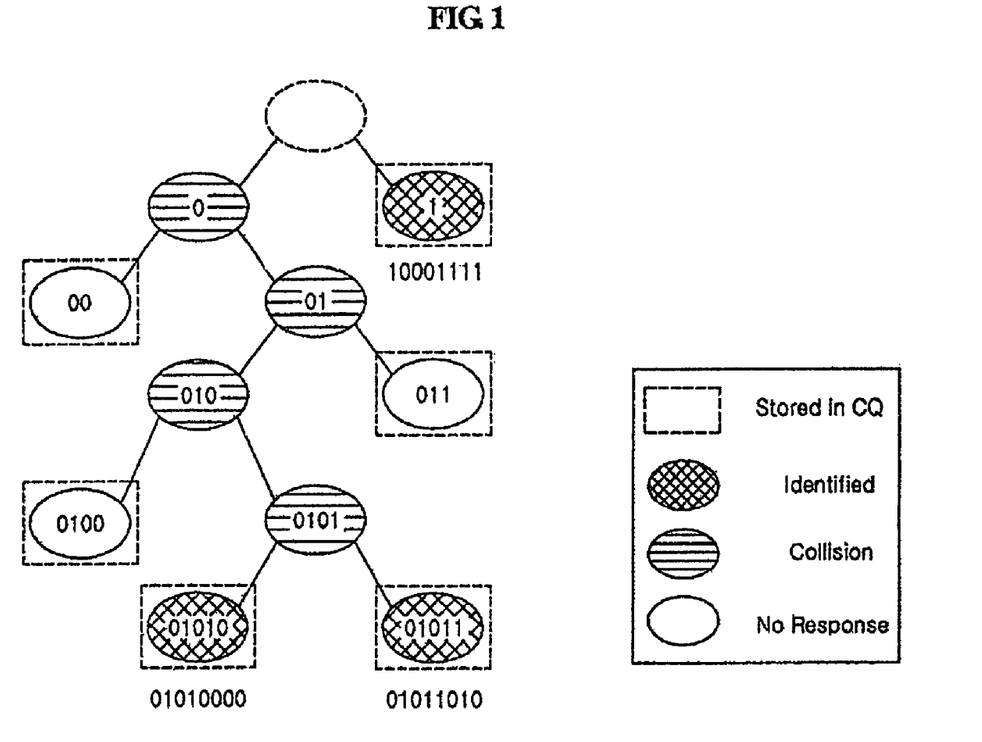
FIG. 1 is a query tree structure diagram illustrating a tag initial identification process in a RFID system according to the present invention.
Figure 2:
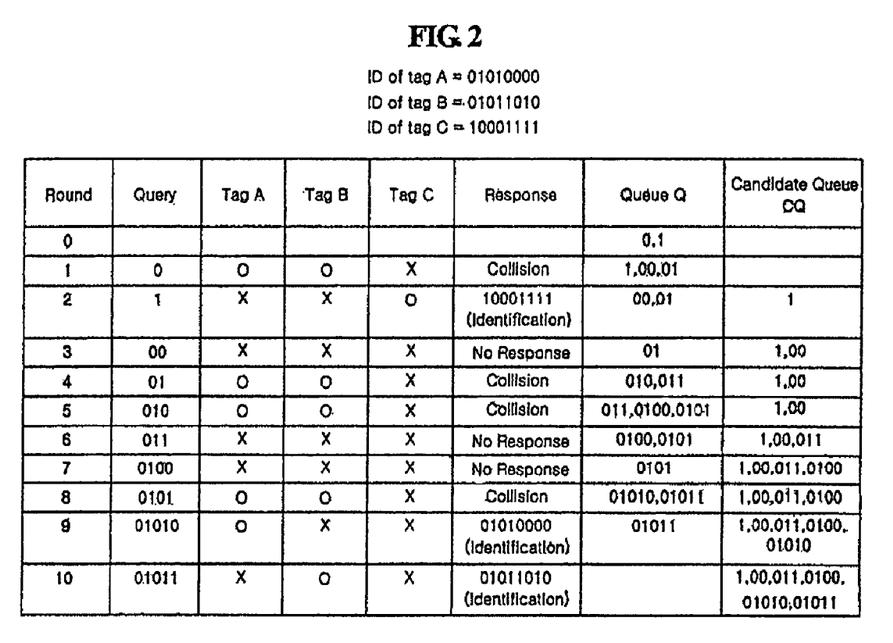
FIG. 2 is an identification table illustrating the tag identification process of FIG. 1.

First, FIG. 1 is a query tree structure diagram a RFID system according to the present invention. FIG. 2 is an identification table illustrating the tag identification process of FIG. 1, in which a process of identifying three tags, the IDs of which are 01010000, 01011010, and 10001111, is illustrated.

In a RFID system according to the present invention, a reader identifies tags through communication with the tags. The communication between the reader and the tags can be represented as a tree, as illustrated in FIG. 1. That is, in a query tree protocol according to the tag identification process of the present invention, a query tree is a data structure representing prefixes transmitted by the reader, and is constructed of a plurality of rounds. In each round, the reader transmits a query and the tags respond with their IDs.

In the tree, each node represents a prefix transmitted by a reader. One node means the time taken for a round in which a reader transmits a prefix and tags respond to it. Therefore, the number of nodes in the tree signifies the time that it takes a reader to identify all tags.

Each query has a different prefix. Only tags, the ID of which matches a prefix, respond. When only one tag responds, the reader successfully identifies the tag. When two or more tags respond, a collision occurs, so that the reader cannot acquire any information about the tags.

However, the reader identifies the existence of the tags whose IDs matched the prefixes. In order to identify tags which lead to the collision, the reader transmits a query with 1-bit longer prefixes in the next round.

Each of the nodes of the query tree means one round in which a reader transmits a prefix and tags respond, and are divided into a collision node, an identified node, and a no-response node. In the query tree of FIG. 1, the reference text 'Identified' represents an identified node, in which a reader successfully identified a tag, because there is only one tag having an ID including a prefix, the reference text 'No-response' represents a no-response node, in which a reader does not receive any response because there is no tag having the ID including the prefix, and the reference text 'Collision' represents a collision node in which there are two or more tags having the ID including the prefix, and several tags transmit their IDs, thereby causing collisions, and a reader cannot identify any tag, and knows only that a collision occurred.

One collision node has two child nodes as shown if FIG. 1. A left child node has a prefix in which 0 is added at the end of a prefix of a parent node, and a right child node has a prefix in which 1 is added at the end of a prefix of the parent node. As a result, all intermediate nodes of the query tree are collision nodes, and each leaf node is either an identified node or no-response node.

In the present invention, a reader has a Queue (Q) field and a Candidate Queue (CQ) field, which are data fields storing prefixes to be used in the identification process.

The queue is initialized before the start of the identification process, and then stores prefixes to be inserted into a subsequent query as collisions occur during the identification process. Therefore, the reader sequentially performs the identification process using the prefixes stored in the queue.

Meanwhile, since the identification delay of tags is most greatly affected by the collision period, which is the sum of delays of collision nodes, the reduction of the number of collision nodes improves the identification ability of the reader. Since the queue is initialized by 0 and 1 in the query tree, the reader has a long collision period. As the number of tags increases, the length of the ID becomes longer, and the IDs of respective tags are similar, therefore the collision period becomes longer.

In order to shorten the collision period, the present invention utilizes information acquired during a previous identification process, so mat, in the RFID system of the present invention, a RFID reader maintains not only a queue but also a candidate queue, and stores the prefixes of all leaf nodes in the query tree, that is, identified nodes and no-response nodes in the candidate queue. In FIG. 1, the prefixes of nodes designated by dot squares are stored in the candidate queue.

Since the prefixes of the identified nodes are prefixes to which only one tag responds, previously identified tags can be quickly identified through the prefixes of the identified nodes. Although a new tag having one of the prefixes of the identified nodes enters the identification range of a reader, it is possible to reduce the occurrence of collisions using the prefixes of the identified nodes, compared to an existing tree-based tag anticollision protocol.

Since all leaf nodes of the query tree are either identified nodes or no-response nodes, the present invention utilizes the prefixes of no-response nodes in order to rapidly identify new tags using the candidate queue, and utilizes the prefixes of identified nodes in order to rapidly re-identify previously identified tags.

As a result, the previously identified tags are identified based on the prefixes of identified nodes without collisions or near-collisions. When a new tag matching one of the prefixes of the identified nodes enters the identification range of a reader, it can be rapidly identified with the prefixes of the identified nodes. The prefixes, which are stored in the candidate queue through query insertion, are illustrated as dot squares in FIG. 1.

The queue is initialized by prefixes stored in the candidate, queue. If there is no prefix in the candidate queue (for example in the case in which a reader is reset), the queue is initialized by 0 and 1.

The reader transmits a query every round, and, when the process of one round ends, deletes the prefix of a corresponding round from the queue.

If a prefix $p_0 p_1 \ldots p_i$ is a prefix causing collisions, the reader inserts the prefixes $p_0 p_1 \ldots p_i 0$ and $p_0 p_1 \ldots p_i 1$ into the queue. The reader continuously repeats this operation until there are no prefixes stored in the queue, therefore all tags can be identified by extending the prefixes.

The identification process for three tags, comprising tag A having an ID of '01010000', tag B having an ID of '01011010' and tag C having an ID of '10001111', and the prefix insertion process of a queue and a candidate queue are described below in detail through FIG. 2 illustrating an identification table for the query tree of FIG. 1.

In the drawings, a queue field represents a prefix stored in the queue during the process of identifying tags, a candidate queue field represents a prefix stored in the candidate queue, and a response field represents a result acquired by the reader after the tags have responded to the reader. In the case in which a tag has responded to a query, 'O' is represented, and in the case which a tag has not responded to a query, 'X' is represented.

As illustrated in FIG. 2, since in the initial tag identification process prefixes have not been stored in the candidate queue, the queue field is initialized by 0 and 1 in round 0 before the tag identification process is performed.

When the identification process has begun and then a reader transmits a query including a prefix of 0 in round 1, a collision occurs because tag A and tag B simultaneously respond. The reader not only deletes prefix 0, used in round 1, from the queue field, but also inserts prefixes 00 and 01 into the queue field. Therefore, at the time of the transmission of the query with prefix 0, the node of round 1 is given child nodes having extended prefixes. Furthermore, since there are no leaf nodes yet, there is no prefix stored in the candidate queue in round 1.

Next, in round 2, when the reader transmits a query with prefix 1, only tag C respond, so that 10001111 which is the ID of tag Q is identified. As a result, the reader deletes prefix 1 of an identified node from the queue, and stores prefix 1 in the candidate queue because the identified node is a leaf node.

In rounds 3 and 4, the reader transmits queries respectively with prefixes 00 and 01 stored in the queue. In round 3, in which prefix 00 has be transmitted, no tags respond, so that 00 is deleted from the queue field and 00 is stored in the candidate queue because the no-response nodes are also leaf nodes. In round 4, as the query with the prefix 01 is transmitted, the tags A and B collide, so that no prefix is added to the candidate queue.

Next, the reader again deletes prefix 01 from the queue field and inserts 010 and 011, to which one bit is added, into the queue field, thereby performing fifth and sixth rounds.

The above-described process continues until all of the tags have been identified. When the identification process is completed, the prefixes of the queue have all been deleted, and only 1, 00, 011, 0100, 01010, and 01011, which are the prefixes of respective leaf nodes designated by dot triangles in the query tree of FIG. 1, are stored in the candidate queue.

When, in the subsequent identification process, the candidate queue is used, a new tag is identified as the prefixes of no-response nodes, which are stored in the candidate queue, by the reader in the case in which there is a tag having a new ID not matched to the prefix of one of the identified nodes. Since all of the leaf nodes of the query tree are identified nodes or no-response nodes, the reader can rapidly identify all tags.

Figure 3:
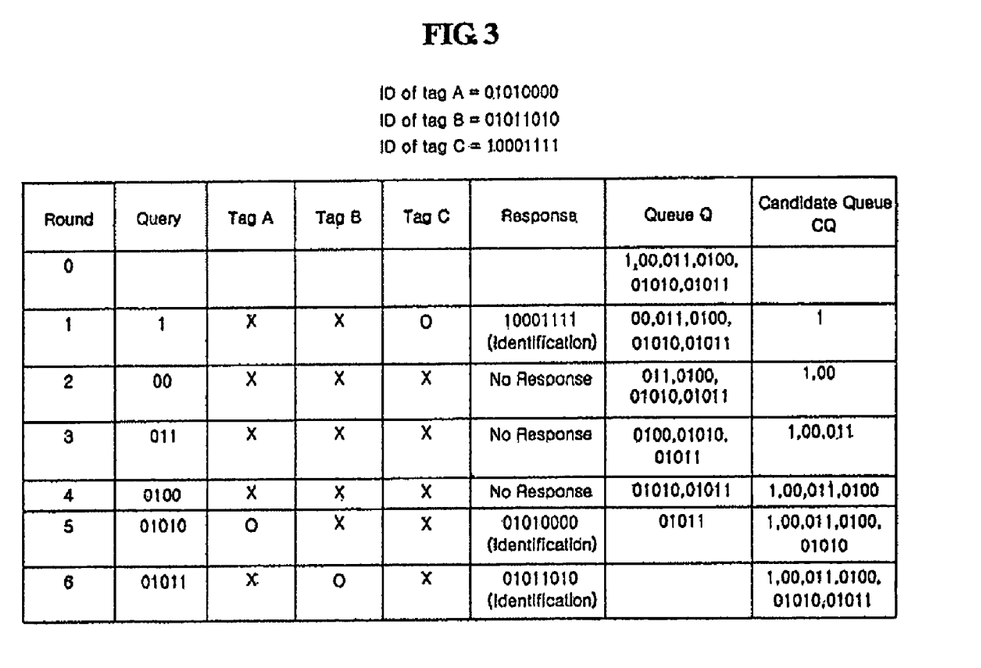
FIG. 3 is an identification table illustrating the identification process after the initial identification process of FIG. 2.

Next, FIG. 3 is an identification table illustrating a process of re-identification after the initial identification process of FIG. 2 has been performed.

As illustrated, in round 0 of the post-identification process, the queue is initialized by 1, 00, 011, 0100, 01010, and 01011, which are prefixes stored in the candidate queue.

In round 1, when a query with prefix 1 is transmitted, tag C, having an ID of 10001111, is identified, and prefix 1 is deleted from the queue. Since a corresponding identified node is a leaf node, prefix 1 is stored in the candidate queue.

In round 2, when a query with the following prefix 00 of the queue is transmitted, the corresponding node becomes a no-response node because there is no new tag. Furthermore, prefix 00 is deleted from the queue and prefix 00 is inserted into the candidate queue. When prefix 011 is transmitted in round 3, and prefix 0100 is transmitted in round 4, no tags respond, therefore prefixes 011 and 0100 are deleted from the queue, and are inserted into the candidate queue.

Next, when prefix 01010 is transmitted in round 5, tag A having ID 01010000, is identified, so that prefix 01010 is deleted from the queue and is inserted into the candidate queue. When prefix 01011 is transmitted in round 6, tag B, having an ID of 01011010, is identified, so that prefix 01011 is deleted from the queue and prefix 01011 of a corresponding identified node is inserted into the candidate queue.

As described above, in the identification process of FIG. 2, a new tag does not enter an identification range and a previously identified tag does not move out of the range, so prefixes that are the same as the results of the initial identification process are stored in the candidate queue, and an identification delay time decreases by four rounds due to the use of the candidate queue, compared to the initial identification process which takes ten rounds.

A process of deleting the prefixes of a candidate queue for each round due to the movement of tags and identifying tags is described below.

A collision node with a prefix of $p_0p_1 \ldots p_i$ has two child nodes with prefix $p_0p_1 \ldots p_i0$ and $p_0p_1 \ldots p_i1$. A pair of child nodes may be two collision nodes, one collision node and one identified node, one collision node and one no-response node, or two identified nodes.

When a tag moves out of an identification range, the states of the two child nodes of the collision node are modified as follows.

First, if child nodes are one identified node and one no-response node, tags which respond to prefixes $p_0p_1 \ldots p_i0$ and $p_0p_1 \ldots p_i1$ are successfully identified by a reader. Since there is no tag having the prefix of the no-response node, the reader can identify a tag using a prefix $p_0p_1 \ldots p_i$ without collision. Since the node of a prefix $p_0p_1 \ldots p_i$ is an identified node, there is ho need to have child nodes.

Next, since there are no tags that successfully respond to prefixes $p_0p_1 \ldots p_i0$ and $p_0p_1 \ldots p_i1$ when child nodes are two no-response nodes, a tag having a prefix $p_0p_1 \ldots p_i$ does not exist in the range of the reader. As a result, the node of a prefix $p_0p_1 \ldots p_i$ is a no-response node, so that child nodes are not necessary.

Meanwhile, the size of the queue is extended by a query insertion process, and the length of prefixes in the queue increases. However, unnecessary no-response nodes interfere with fast identification. In order to overcome this problem, if the nodes of the prefixes $p_0p_1 \ldots p_i0$ and $p_0p_1 \ldots p_i1$ are an identified node and a no-response node, or two no-response nodes, the candidate queue stores a prefix $p_0p_1 \ldots p_i$, instead of prefixes $p_0p_1 \ldots p_i0$ and $p_0p_1 \ldots p_i1$.

The above-described query deletion process continues until there is no pair of nodes having the same parent node, that is, an identified node and a no-response node, or a no-response node and a no-response node. Through the query deletion process, the candidate queue can eliminate the prefixes of unnecessary no-response nodes.

That is, when tags identified by the reader are not identified, the two child nodes of a collision node are either an identified node and a no-response node or two no-response nodes.

In the case of an identified node and a no-response node, a tag towing a prefix $p_0p_1 \ldots p_b0$ (or a prefix $p_0p_1 \ldots p_b1$) is successfully identified. Since there is no tag having a prefix $p_0p_1 \ldots p_b1$ (or prefix $p_0p_1 \ldots p_b0$), the tag is successfully identified through a prefix $p_0p_1 \ldots p_b$ without collision. Therefore, the prefix $p_0p_1 \ldots p_b$ is an identified node, and has unnecessary child nodes.

In the case of two no-response nodes, tags having the prefixes $p_0p_1 \ldots p_b0$ and $p_0p_1 \ldots p_b1$ do not exist, and a tag having the prefix $p_0p_1 \ldots p_b$ also does not exist. As a result, the node with prefix $p_0p_1 \ldots p_b$ has unnecessary child nodes as no-response nodes.

As a result, in order to eliminate the prefixes of unnecessary no-response nodes, when the node of the prefix $p_0p_1 \ldots p_b0$ and the node of the prefix $p_0p_1 \ldots p_b1$ are an identified node and a no-response node, or two no-response nodes, the prefixes $p_0p_1 \ldots p_b0$ and $p_0p_1 \ldots p_b1$ are deleted from the candidate queue and the prefix $p_0p_1 \ldots p_b$ is stored in the candidate queue.

That is, when the prefixes $p_0p_1 \ldots p_b0$ and $p_0p_1 \ldots p_b1$ are stored in the candidate queue, the query deletion process is repeatedly performed until the state is reached in which there is no node having a prefix $p_0p_1 \ldots p_b0$ with a node having a prefix $p_0p_1 \ldots p_b1$ as an identified node and a no-response node, or two no-response nodes.

The above-described process is described below with respect to FIGS. 4 to 6.

Figure 4:
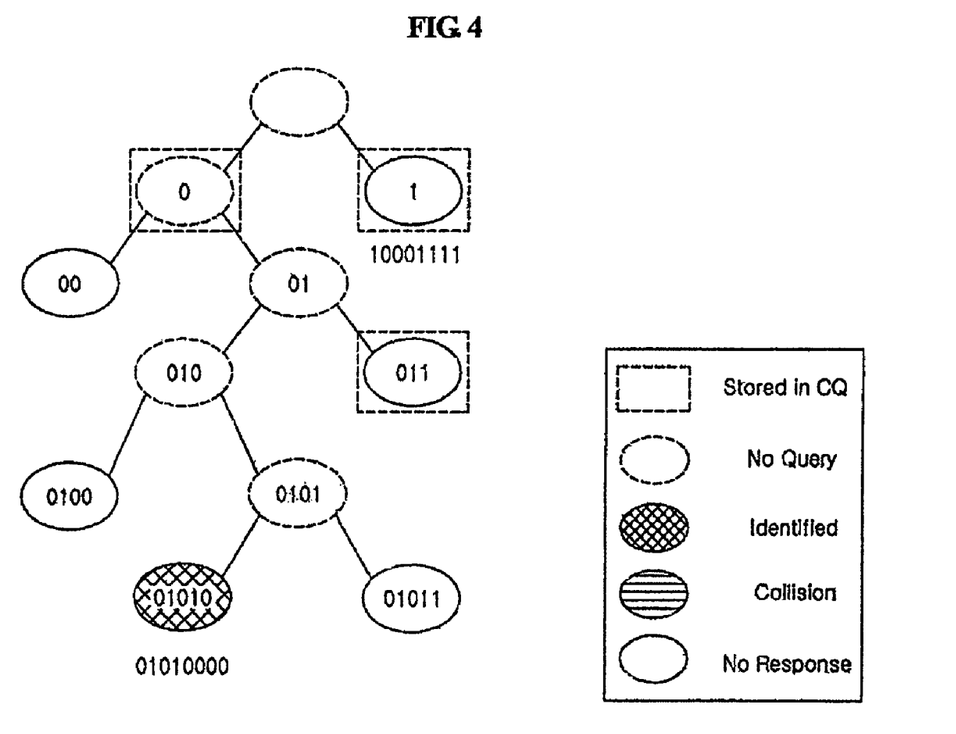
FIG. 4 is a query tree structure diagram illustrating a tag identification process according to the movement of previously identified tags.
Figure 5:
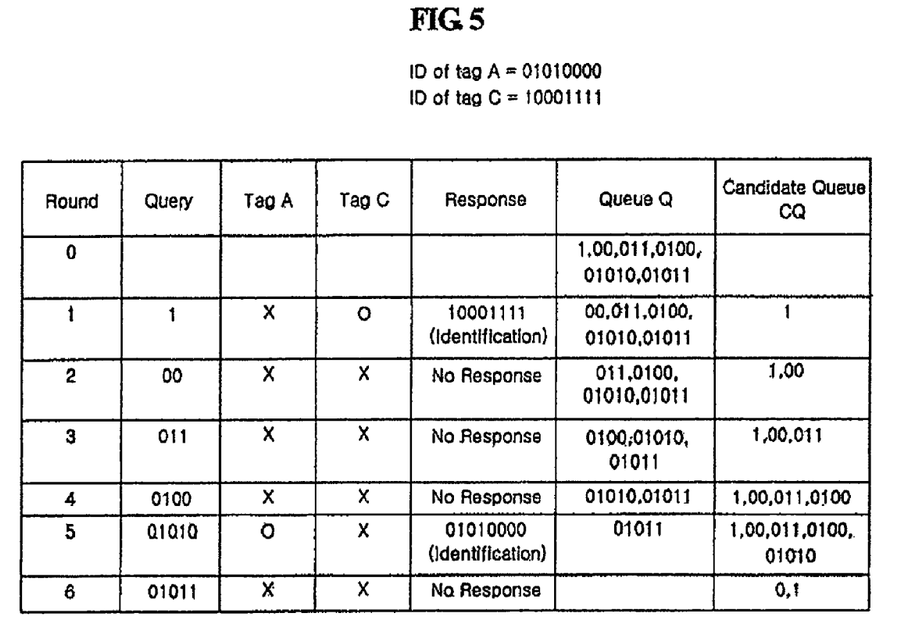
FIG. 5 is an identification table illustrating the process of FIG. 4.
Figure 6:
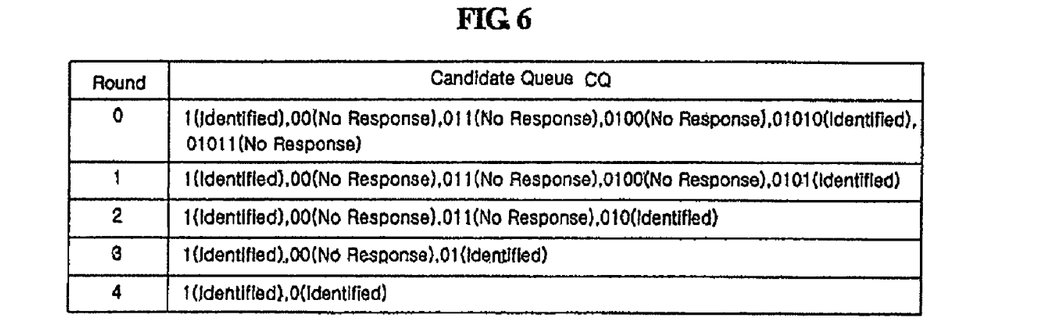
FIG. 6 is a table illustrating a process of deleting the query of a candidate queue in the identification table of FIG. 5.

FIG. 4 is a query tree structure diagram illustrating a tag identification process according to the movement of previously identified tags, FIG. 5 is an identification table illustrating the process of FIG. 4, and FIG. 6 is a table illustrating the process of deleting the query of a candidate queue in the identification table of FIG. 5.

FIGS. 4 to 6 illustrate the identification process in the case in which tag B moves and then does not exist in an identification range. Referring to the query tree of FIG. 4, before the performance of the identification process, a queue is initialized by prefixes 1, 00, 011, 0100, 01010, and 01011 which are the prefixes eventually stored in the candidate queue according to the process of FIG. 2 or FIG. 3, so that tag C, having ID 10001111, is identified by prefix 1, and tag A, having ID 01010000, is identified by prefix 01010.

As a result, only prefixes 0 and 1 of nodes designated by dot triangles are stored in the candidate queue, which is described in detail with respect to FIGS. 5 and 6.

FIG. 5 is a diagram illustrating a first identification process after the movement of tag B.

A reader is initialized by 1, 00, 011, 0100, 01010, and 01011, which are prefixes of a candidate queue in round 0. In round 1, prefix 1 is transmitted, so that tag C is identified and prefix 1 is stored in the candidate queue. In round 2, prefix 00 is transmitted, and 00 is stored in the candidate queue based on the no-response state.

Furthermore, in round 3, after the transmission of prefix 011, 011 is stored in the candidate queue because of the no-response state. In round 4, after the transmission of prefix 0100, 0100 is also stored in the candidate queue because of the no-response state. In round 5, when 01010 is transmitted, tag A is identified, and 01010 is stored in the candidate queue.

In round 6 which is the final round, when the reader transmits 01011, there is no-response because tag A and tag C have both already been identified, so that 01011 is temporarily stored in the candidate queue.

However, as described above, in the present invention, when the two child nodes are no-response and no-response nodes or identified and no-response nodes, the prefixes of the two child nodes are deleted from the candidate queue and a prefix of the parent node thereof is stored.

Therefore, the reader stores prefix 0101 of the parent node, instead of prefixes 01010 and 01011 of the candidate queue. If prefixes 0101 and 0100 co-exist, they are again deleted, and prefix 010 of the parent node thereof is stored. Furthermore, if prefixes 010 and 011 co-exist, prefixes 010 and 011 are deleted, and a prefix 01 of the parent node thereof is stored. As a result, prefixes 00 and 01 co-exist, so that a prefix 0 of the parent node thereof is stored, instead of 00 and 01.

Eventually, only prefixes 0 and 1 are stored in the candidate queue.

The process of deleting the candidate queue is again described with respect to FIG. 6. In round 0, although prefixes 1, 00, 011, 0100, 01010, 01011 exist in the candidate queue, in round 1, prefixes 01010 and 01011 are deleted and prefix 0101 is inserted. In round 2, prefixes 0100 and 0101 are deleted, and a prefix 010 is inserted. In round 3, prefixes 010 and 011 are inserted, and therefore, only prefixes 0 and 1 are stored in the candidate queue.

The prefix deletion process of the candidate queue continues until the case in which the two child nodes of the candidate queue having the same parent node are no-response and no-response nodes, or identified and no-response nodes does not exist. The process is generated sequentially after the process of FIG. 5, and is round 7 after round 6 of FIG. 5.

Figure 7:
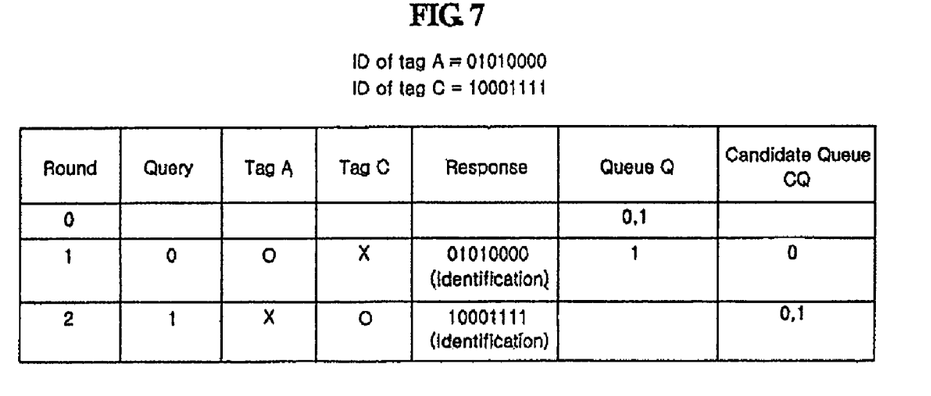
FIG. 7 is a table illustrating an identification process after the initial identification process according to the movement of the tags of FIG. 5.

FIG. 7 is a table illustrating an identification process after the initial identification process according to the movement of the tags of FIG. 5, which still illustrates a second identification process in the condition in which tag B moves.

As illustrated, a queue is initialized by prefix 0 and 1 stored in a candidate queue according to a previous identification process. In round 1, when the reader conducts a query with prefix 0, tag A of ID 0101000 is identified, prefix 0 is deleted from the queue, and stored in the candidate queue.

Next, in round 2, when the reader transmits prefix 1, tag C of ID 10001111 is identified, prefix 1 is deleted from the queue, and stored in the candidate queue.

As above mentioned, a first identification process after the movement of tag B consists of six rounds, but a second identification process consists of only two rounds. So the reader can identify all tags quickly.

Since those skilled in the art can implement other specified embodiments of the invention without modifying the technical spirit and essential characteristics thereof, it must be appreciated mat the above-described embodiments are illustrative but not restrictive. The scope of the present invention is represented by the accompanying claims rather than the description, and all modifications and variations derived from the meaning, scope and equivalents of the claims are to be interpreted as being included in the scope of the present invention.

INDUSTRIAL APPLICABILITY

According to a tag anti-collision Radio Frequency Identification (RFID) system and a method for tag identification of the present invention, an identification delay is decreased by using prefixes which do not cause collisions, and the number of tag collisions is considerably diminished by query insertion and deletion processes.

The invention claimed is:

1. A method for tag identification of a Radio Frequency Identification (RFID) reader within the identification range of the RFID reader for identifying a plurality of RFID tags which transmit their own IDs to the RFID reader when prefixes of queries received from the RFID reader match front portions of the RFID tags' IDs, comprising:

a first step of initializing a queue (Q) field and storing a prefix having 1 to n bits (n=the bit numbers of a tag's ID) of a candidate queue (CQ) field in the queue field,
wherein, assuming that a pair of processes, in which the RFID reader transmits a query and one or more RFID tag respond to it, is one round, the RFID reader has a data field including the queue field and the candidate queue field which store prefixes to be transmitted in a subsequent round, wherein the RFID reader re-transmits prefixes one bit longer than prefixes previously transmitted in each successive round and continues to extend prefixes until the ID's of all tags have been identified;
a second step of transmitting a query with the prefix stored in the queue field to the RFID tags, and deleting the transmitted prefix from the queue field;
a third step of inserting a prefix, in which prefixes 0 and 1 corresponding to one bit are inserted into a rear portion of a prefix of a previously transmitted query, into the queue field if two or more tags respond to the previously transmitted prefix and, therefore, the tags cannot be identified, and inserting the prefix of the previously transmitted query into the candidate queue field and deleting an unnecessary prefix stored in the candidate queue if there is no response or only one tag responds with respect to the previously transmitted prefix; and
a fourth step of determining whether a prefix stored in the queue field exists, and returning to the second step if there is a prefix stored in the queue field,
wherein the RFID reader identifies a new tag entering identification range of the RFID reader based upon the prefixes of identified nodes stored in the candidate queue field when an ID of the new tag matches one of the prefixes of the identified nodes and identifies the new tag based on the prefixes of no-response nodes stored in the candidate queue field when the ID of the new tag does not match one of the prefixes of the identified nodes.

2. The method as set forth in claim 1, wherein the deletion of the unnecessary prefix at the third step is performed by deleting prefixes of child nodes when prefixes of the child nodes of a node corresponding to the previously transmitted prefix are stored in the candidate queue if there is no response or only one tag responds with respect to the previously transmitted prefix.

3. The method as set forth in claim 2, wherein, at the third step, the RFID reader repeatedly performs the step of deleting the prefixes of the corresponding child nodes and inserting a prefix of a corresponding parent node until neither an identified node and a no-response node, nor a no-response node and a no-response node, exist in the candidate queue, the two nodes having an identical parent node, thereby deleting all prefixes of unnecessary no-response nodes from the candidate queue.

4. The method as set forth in claim 1, wherein, at the first step, the RFID reader is initialized by storing prefixes 0 and 1 in the queue field when there is no prefix stored in the candidate queue field.

5. A tag anti-collision RFID system, comprising:
RFID tags transmitting their own IDs to a RFID reader when prefixes of queries received from the RFID reader matches the front portions of the RFID tags' IDs; and
a RFID reader having a data field including a queue (Q) field and a candidate queue (CQ) field which, assuming that a pair of processes in which the RFID transmits a query and one or more RFID tags respond to it, store prefixes to be transmitted in a subsequent round, initializing the queue field, storing a prefix of the candidate queue field in the queue field, sequentially transmitting a query with the prefix stored in the queue field to the RFID tags until all of the tags are identified, deleting the transmitted prefix from the queue field, inserting a prefix, in which prefixes 0 and 1 corresponding to one bit are inserted into a rear portion of a prefix of a previously transmitted query, into the queue field if two or more tags respond to the previously transmitted prefix, and inserting the prefix of the previously transmitted query into the candidate queue field and deleting an unnecessary prefix stored in a candidate queue if there is no response or only one tag responds with respect to the previously transmitted prefix,
wherein the RFID reader identifies a new tag based upon the prefixes of identified nodes stored in the candidate queue field when an ID of the new tag matches one of the prefixes of the identified nodes and identifies the new tag based on the prefixes of no-response nodes stored in the candidate queue field when the ID of the new tag does not match one of the prefixes of the identified nodes.

6. The system as set forth in claim 5, wherein the RFID reader deletes the prefixes of child nodes when the prefixes for the child nodes of a node corresponding to the previously transmitted prefix are stored in the candidate queue if there is no response or only one tag responds with respect to the previously transmitted prefix.

7. The system as set forth in claim 6, wherein the RFID reader repeatedly performs the step of deleting the prefixes of the corresponding child nodes and inserting a prefix of a corresponding parent node until no pair of an identified node and a no-response node; or of a no-response node and a no-response node, exists in the candidate queue, the two nodes having an identical parent node, thereby deleting all prefixes having unnecessary no-response nodes from the candidate queue.

8. The system as set forth in claim 5, wherein the RFID reader is initialized by storing prefixes 0 and 1 in the queue field when there is no prefix stored in the candidate queue field.

* * * * *